(12) United States Patent
Kirchner

(10) Patent No.: US 7,014,779 B1
(45) Date of Patent: Mar. 21, 2006

(54) VACUUM SEPARATION, TRANSPORT AND COLLECTION SYSTEM FOR IMMISCIBLE LIQUIDS

(76) Inventor: Edward C. Kirchner, 131 Churchill St., Pittsfield, MA (US) 01201

( * ) Notice: Subject to any disclaimer, the term of this patent is extended or adjusted under 35 U.S.C. 154(b) by 149 days.

(21) Appl. No.: 10/801,280

(22) Filed: Mar. 16, 2004

Related U.S. Application Data

(60) Provisional application No. 60/455,894, filed on Mar. 19, 2003.

(51) Int. Cl.
*C02F 1/40* (2006.01)

(52) U.S. Cl. .................... 210/739; 210/744; 210/776; 210/799; 210/800; 210/804; 210/808; 210/86; 210/109; 210/138; 210/143; 210/523; 210/538

(58) Field of Classification Search ............... 210/739, 210/744, 776, 799, 800, 804, 808, 86, 109, 210/138, 143, 523, 538
See application file for complete search history.

(56) References Cited

U.S. PATENT DOCUMENTS

| | | | | |
|---|---|---|---|---|
| 3,769,207 A | * | 10/1973 | Baer | ................... 210/703 |
| 4,274,957 A | | 6/1981 | Koller | |
| 5,026,488 A | | 6/1991 | Mesheau | |
| 5,405,538 A | * | 4/1995 | Batten | ................... 210/744 |
| 6,562,503 B1 | | 5/2003 | Grasso et al. | |

* cited by examiner

*Primary Examiner*—Robert A. Hopkins
(74) *Attorney, Agent, or Firm*—Malcolm J. Chisholm, Jr.

(57) ABSTRACT

A vacuum separation, transport and collection system for immiscible liquids includes a separator (12) for separating two immiscible liquids such as oil and a water-based coolant, and for directing the separated immiscible liquid into a holder (16). A collector (18) is secured through a vacuum line (20) with the holder (16) and a vacuum generator (22) applies a vacuum to the collector (18) and holder (16). A controller (28) controls the vacuum generator (22) to apply a vacuum to the collector (18) and the holder (16) for a predetermined vacuum duty cycle for periodically removing separated immiscible liquid (26) from the holder (16) into the collector (18). Contaminants in the immiscible liquid cannot degrade performance of the system because such contaminants do not contact the vacuum generator (22) or controller (28).

20 Claims, 3 Drawing Sheets

VACUUM SEPARATION, TRANSPORT AND COLLECTION SYSTEM FOR IMMISCIBLE LIQUIDS

CROSS REFERENCE TO RELATED APPLICATION

This Application claims the benefit of U.S. Provisional Application Ser. No. 60/455,894 filed on Mar. 19, 2003, and entitled "Skimmer, transport mechanism, collection and separation system".

TECHNICAL FIELD

The present invention relates to systems for separating and collecting immiscible liquids, and especially relates to an improved, efficient, vacuum powered system for separating, transporting and collecting immiscible liquids such as oil and water-based solutions.

BACKGROUND ART

It is well known that water-based coolants are commonly used to cool machine tools during cutting or other operations of the tools. Typically, the coolant solutions are applied to heated components of the tool, and either recirculated through machine or collected for subsequent usage. Such used water-based coolants frequently contain contaminants such as lubricating oils from the machine tools, and metal particles. These coolants may be recirculated and cleaned in a continuous operation, or they may be removed for storage and reprocessing. When the coolants are recirculated, oil and debris collect to form an immiscible film on surfaces of the coolant. Such a film, when not removed, facilitates aerobic degradation of the coolant, and hence shortens coolant life and inhibits optimal performance of the machine tool. Therefore, it is desirable to recycle such coolants for many reasons, including enhanced performance, as well as the high cost of purchase and/or disposal of the coolants, etc. Typically the used coolants are stored in barrels or similar containers wherein the coolants separate from non-soluble, immiscible oil or other liquid contaminants so that the oil forms a liquid layer floating on top of the water-based coolant.

It is known to use different kinds of separating devices to process such layered fluids of coolant and oil in order to remove the oil and other contaminants from the coolant. Thereafter the water-based coolants can also be processed for subsequent usage, such as disclosed in U.S. Pat. No. 5,026,488 to Mescheau that issued on Jun. 25, 1991 for a "Liquid Recycling System". A less complicated and more typical separating apparatus is disclosed in U.S. Pat. No. 4,274,957 to Koller that issued on Jun. 23, 1981. Those patents are hereby incorporated herein by reference. Koller shows a portable, self-contained skimmer that uses an endless, flexible belt that is extended through an opening in a top of a barrel of collected, contaminated coolant. Contaminating oil is attached and/or adsorbed by the belt and passes with the belt into a housing having a drive motor for moving the endless belt. The housing also has a drive roller and a pinch or deflection roller that cooperate to squeeze the attached and/or adsorbed oil and any amount of accompanying coolant off the belt, and the oil and any coolant then pass along a trough in the housing and out of a spout into a container for holding the separated oil. The belt moves continuously through the layer of oil until the oil is removed. The water-based coolant may then be further processed if necessary for recycling usage.

Known separators of such immiscible liquids provide for some effective separation, but they also have major difficulties. For example, such self-contained skimmer separators as shown in Koller do not have controllers to cycle operation times for automated, efficient operation. Simply running such skimmers indefinitely tends to increase an amount of water-based coolant separated with the oil as the oil layer decreases in thickness. Also, known skimmer separators simply provide for storage of the separated oil in a container with no control system for avoiding overflow of the container. Overflow of separated lubricants onto a factory floor presents very substantial risks for accidents resulting from such spillage. Avoiding such overflows would require a considerable expenditure of manual labor to start, monitor and stop such skimmer separators. Additionally, it is known that separated lubricants include dissolved gases and suspended metal contaminants, so pumping separated contaminating oils presents substantial challenges for any pumping and collecting system. The suspended metal particles will rapidly degrade most impeller types of pumps, and movement and storage of the separated oil contaminants give rise to foaming and consequent transport and storage problems.

It is also known that separating oil from water is an enormous environmental concern related to accidental contamination of various waterways within our environment. Systems utilized for separating oil contaminants from machine tool coolants may also be utilized for separating, transporting and collecting contaminating oils from environmental oil spillages, for example in oceans, lakes, ponds, and streams, etc. Any such oil separating systems, however, will necessarily suffer from the structural limitations facing known separators of oil contaminants of water-based coolants. Consequently, there is a need for an improved system for separating mixed immiscible liquids that is durable, automatic, inexpensive to manufacture and operate, and that minimizes risks of spillage of separated liquids.

DISCLOSURE OF INVENTION

The invention is a vacuum separation, transport and collection system for immiscible liquids. The system includes a separator, such as an endless belt skimmer, for separating two immiscible liquids such as oil and a water-based coolant. The separator directs the separated liquid, such as the oil, into a holder for temporary storage of the separated liquid. A collector is secured in fluid communication with the holder through a hose, tube, pipe, or similar vacuum line. A vacuum generator is secured in fluid communication with the collector for applying a vacuum to the collector. The vacuum line between the collector and the holder directs the vacuum to the holder so that the separated immiscible liquid in the holder is drawn into the collector by the vacuum.

A controller is secured in communication with the vacuum generator means for applying a vacuum to the collector and the holder for a predetermined vacuum duty cycle for periodically removing separated immiscible liquid from the holder into the collector. In a preferred embodiment, the controller is also secured in communication with the separator for controlling operation of the separator for a predetermined separator duty cycle. The controller therefore may include one or more timers that operate the separator for a separator duty cycle, for example for thirty minutes of each five and one-half hour period, and that operate the vacuum generator for a vacuum duty cycle of two minutes of each ten minutes while the separator is operating. By having the vacuum generator and vacuum line cooperatively structured to draw a flow rate of separated immiscible liquid from the holder at a much greater rate than a flow rate of separated immiscible liquid from the separator, suspended particulate contaminants do not have adequate resident time in the separated immiscible liquid within the holder and vacuum line to settle in the holder or vacuum line or to plug the vacuum line. The controller may also be in communication with a volume sensor within the collector so that the controller shuts off the vacuum generator whenever a volume or amount of collected immiscible liquid within the collector reaches a predetermined amount to prevent overfilling of the collector. The system therefore provides for automated and efficient separation, transport and collection of the immiscible liquid. By use of the vacuum generator for transport and collection, contaminants in the immiscible liquid cannot degrade performance of the system because such contaminants do not contact the vacuum generator or controller. Application of the vacuum also assists in degassing the immiscible liquid, and removing gaseous components of the immiscible liquid without compromising storage efficiency of the collector.

In a preferred embodiment, the controller and vacuum generator are secured within a common housing, and the housing includes an integral sealing cap for sealing the collector to the housing. In such an embodiment, the collector may be simply unscrewed or otherwise detached from the housing while the controller has terminated operation of the vacuum generator to efficiently dispose of the collected immiscible liquid. If the vacuum generator is started after the collector is detached, no separated liquid could flow from and be spilled out of the holder because the removed collector interrupts the vacuum to the holder. This is a significant safety feature that is an additional advantage over pump systems. The immiscible liquid may then be poured out of the collector, after which the collector is re-attached to the housing to place the system ready for operation again. In a further embodiment, the collector may include automatic discharging apparatus for removing the separated immiscible liquid from the collector.

In another embodiment, the vacuum system includes a screen secured between the separator and the holder, wherein a shortest internal diameter of a vacuum line directing flow of the immiscible liquid between the holder and the collector is at least two times longer than a longest distance across any of the passageways defined within the screen. Such a relationship between the screen and the vacuum line minimizes any possibility of solid particulates clogging the vacuum line. In an additional embodiment, the vacuum line is dimensioned to enhance degassing by optimizing a relationship between an internal diameter of the vacuum line and a length of the vacuum line between the holder and the collector in order to exceed a minimal residence time for the liquid passing through the vacuum line. Enhanced degassing of the immiscible liquid passing through the vacuum line is achieved by providing adequate time for bubble formation of the gas within the liquid so that when the mixed phase fluid flows out of a spray nozzle into the collector the bubbles burst and degassing occurs. However, too long a resident time will reduce operational efficiency of the vacuum system. Consequently, enhanced efficiency is achieved when a minimal residence time to achieve degassing is exceeded. For example, an internal diameter of about one-quarter inch (0.25") and a length of about eight feet (8.0') produces nearly optimal degassing of the collected, separated liquid passing through the vacuum line to the collector.

In yet another embodiment, the vacuum system also includes a separation container secured in fluid communication with the vacuum line between the holder and the collector to further facilitate separation of any undesired, second or water-based immiscible liquid from the first or oil-based immiscible liquid. The separation container provides for gravity-based separation of the second immiscible liquid, heavier, water based immiscible liquid. The first, or oil-based immiscible liquid is drawn by the vacuum into the vacuum line from an upper portion of the separation container into the collector. The separation container may be intermittently removed from the system to pour out any separated second or water-based immiscible liquid, or the water-based immiscible liquid may be automatically discharged from the separation container.

In a further embodiment, the vacuum generator is a "venturi effect" generator, wherein a stream of compressed air passes through a venturi chamber generating a vacuum within the vacuum line that is secured to the venturi chamber. The venturi chamber is within the housing, and exhausted pressurized air is discharged from the venturi chamber and through the housing and over controller components then through cooling holes defined within the housing to provide for cooling of the controller. Additionally, the controller and skimmer may be powered by a reduced voltage, such as twelve volts direct current, to minimize risk to users of the system.

Accordingly, it is a general purpose of the present invention to a provide vacuum separation, transport and collection system for immiscible liquids that overcomes deficiencies in the prior art.

It is a more specific purpose to provide a vacuum separation, transport and collection system for immiscible liquids that provides for automated, efficient, safe, and durable separation, transport and collection of a separated immiscible liquid.

These and other purposes and advantages of the present vacuum separation, transport and collection system for immiscible liquids will become more readily apparent when the following description is read in conjunction with the accompanying drawing.

DESCRIPTION OF THE PREFERRED EMBODIMENTS

Figure 1:
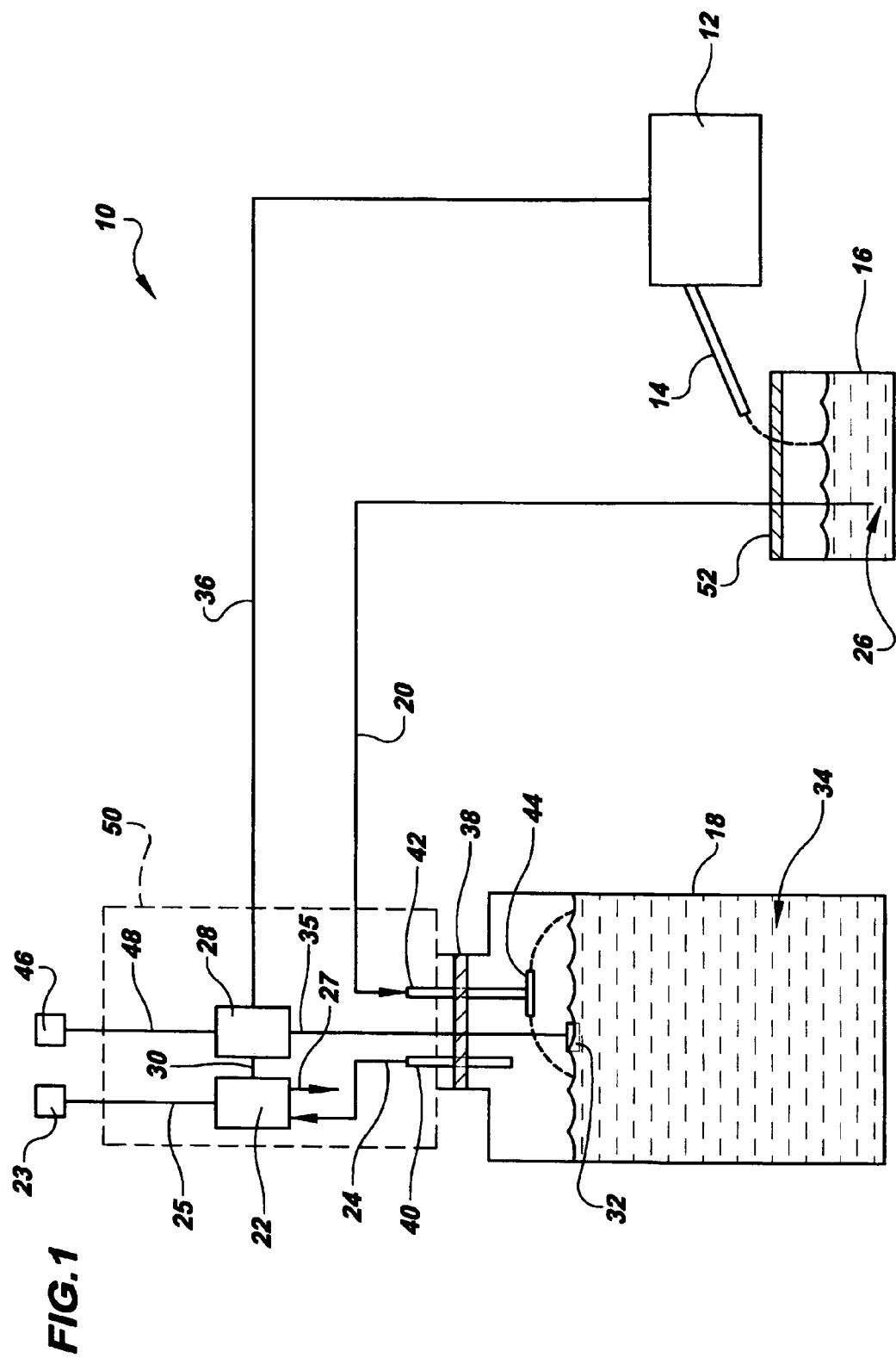
FIG. 1 is a simplified, schematic representation of a vacuum separation, transport and collection system for immiscible liquids constructed in accordance with the present invention.

Referring to the drawings in detail, a vacuum separation, transport and collection system for immiscible liquids is shown in FIG. 1, and is generally designated by the reference numeral 10. The vacuum system 10 includes a separator means 12 for separating two or more immiscible liquids. The separator means may be any known separator capable of separating immiscible liquids, such as a skimmer separator shown in the aforesaid U.S. Pat. No. 4,274,957 to Koller. An exemplary skimmer is available under the trademark RUSTLICK® Tramp Oil Skimmer, part number 78,012 from the ITW ROCOL NORTH AMERICA company, of Glenview, Ill. Additionally, a skimmer separator such as in the Koller Patent is available under the trademark OYBELT®, from the OYBELT®Corporation, of North Lake, Wis. The separator means 12 directs a separated immiscible liquid through a spout 14 into a holder 16, that is secured in fluid communication with the separator means 12. The vacuum system 10 also includes a collector 18 secured in fluid communication with the holder 16 through a vacuum line 20. The vacuum line may be any hose, tube, pipe or similar conduit capable of transmitting a vacuum and vacuum drawn liquid through the line 20.

A vacuum generator means 22 is secured in fluid communication with the collector 18 for applying a vacuum to the collector 18. The vacuum generator means 22 may be any vacuum generator known in the art capable of applying a vacuum to a vacuum inlet line 24 secured between the vacuum generator 22 and the collector 18. An exemplary vacuum generator means is, a "venturi effect" type of vacuum generator available as part no. VG-010-00-00 from the GAST Manufacturing, Inc. company, a division of the IDEX Corporation of Benton Harbor, Mich. An additional vacuum generator means may be a suction generating eductor, or ejector, as disclosed in U.S. Pat. No. 6,562,503 that issued on May 13, 2003 to Grasso et al. For such "venturi effect" or "eductor" types of vacuum generators, a source of compressed air 23 directs compressed air through a compressed air feed line 25 into the vacuum generator 22 and out of the generator 22 through a vacuum exhaust vent 27.

A vacuum generated by the vacuum generator 22 passes through the vacuum inlet line 24 and vacuum line 20 into the holder 12 so that separated immiscible liquid 26 within the holder 12 in contact with the vacuum line 20 is drawn by the vacuum into the collector 18. A controller means 28 is secured in communication through line 30 with the vacuum generator 22, for applying a vacuum to the collector 18 and the holder 16 for a predetermined vacuum duty cycle for periodically removing separated immiscible liquid 26 from the holder 16 into the collector 18. In a preferred embodiment, the controller 28 is also secured in communication through line 36 with the separator 12 for controlling operation of the separator 12 for a predetermined separator duty cycle. Line 36 may be an electrical, hydraulic, pneumatic, or mechanical line, or any form of communication capable of controlling the skimmer 12 to initiate and terminate operation.

The controller 28 may operate the separator 12 for a separator duty cycle, for example for thirty minutes of each five and one-half hour period, and the controller may also operate the vacuum generator 22 for a vacuum duty cycle of two minutes of each ten minutes while the separator 12 is operating. By having the vacuum generator 22 and vacuum line 20 cooperatively structured to draw a flow rate of separated immiscible liquid from the holder 16 at a much greater rate than a flow rate of separated immiscible liquid from the separator 12, suspended particulate contaminants within the separated immiscible liquid do not have adequate resident time within the holder 16 and vacuum line 20 to settle in the holder or vacuum line or to plug the vacuum line. This beneficial relationship of the vacuum generator 22, vacuum line 20 and separator 12 will be characterized herein as the vacuum generator 22 and vacuum line 20 being cooperatively structured to produce a flow rate of separated immiscible liquid from the holder 16 to the collector 18 that is greater than a flow rate of separated immiscible liquid from the separator 12 to the holder 16.

The controller means 28 may also be secured in communication with a volume sensor 32 within the collector 18. The volume sensor 32 senses a level of separated, collected immiscible liquid 34 within the collector 18 so that whenever the liquid 34 in the collector 18 achieves a predetermined level, as shown in FIG. 1, the volume sensor 32 communicates through line 35 to the controller means 28. The controller means 28 then communicates through line 30 with the vacuum generator 22 to stop generating a vacuum, thereby preventing an accidental overflow of the collector 18. An exemplary volume sensor is available under the model number F7-BT, from the DWYER INSTRUMENTS, Inc. company of Michigan City, Ind.

The controller means may be any controller apparatus known in the art that is capable of controlling a vacuum duty cycle of the vacuum generator 22, and that may also be capable of controlling a separator duty cycle of the separator 12, and that may also be capable of responding to a sensed liquid level by communicating to the vacuum generator 22 to terminate operation, such as a microcomputer, electromechanical switches, mechanical actuators secured to a floating volume sensor, etc. An exemplary controller is available under a brand name of "TGKAD Series", part no. 72200/05HAA2H from the Airtronics company of Cazenovaia, N.Y. As described in more detail below, the controller means 28 may include one or more timers and/or solenoids, etc. for controlling a predetermined cycle, meaning a time and/or duration of operation, of the separator 12 and the vacuum generator 22 for fully automated operation of the vacuum system 10.

The collector 18 may be in the form of a translucent, transparent or metal bottle having a standard threaded vacuum sealing cap 38, wherein the vacuum inlet line 24 is secured to a first vacuum fitting 40 in the sealing cap 38, the vacuum line 20 is secured to a second vacuum fitting 42 in the sealing cap 38, and the volume sensor 32 line 35 likewise includes a sealed fitting passing through the sealing cap 38. The sealing cap 38, with the integral vacuum fittings facilitates operation of the vacuum system 10 by permitting unscrewing or detachment of the collector 18 from the cap 38 to remove and dispose of the collected immiscible liquid 34 within the collector 18 and then re-attach the collector 18 to its cap 38 without interfering with operation of the vacuum generator 22, controller 28, or other system components. If the vacuum generator 22 is started after the collector 18 is detached, no separated liquid 26 within the holder 16 could flow from and be spilled out of the holder 16 because the removed collector 18 interrupts the vacuum to the holder. This is a significant safety feature that is an additional advantage over known pump systems. The vacuum line 20 within the collector 18 may include a multiple outlet, unrestricting discharge nozzle 44, such as an inverse "T"-shaped nozzle having two opposed outlets that do not restrict a flow rate of the immiscible fluid through the vacuum line 20, for enhancing degassing of separated immiscible liquid passing through the unrestricting discharge nozzle 44 prior to the liquid 34 entering the collector 18. To enhance degassing of the immiscible liquid, the unrestricting discharge nozzle 44 provides for smaller diameter streams than the stream of liquid in the vacuum line 20.

The smaller diameter streams facilitate bubble bursting within, the smaller streams to enhance degassing. The unrestricting discharge nozzle 44 includes a plurality of outlets that do not restrict or impede flow through the vacuum line 20, but that define narrower diameter outlets than the internal diameter of the vacuum line 20. The collector may also include an automated discharging means (not shown) for automatically removing separated, collected immiscible liquid 34 within the collector 18, such as any apparatus capable of automatically discharging a liquid from a container known in the art.

To further enhance safe operation of the vacuum system 10, the system may include a power transformer 46 that converts standard electrical current into a safer current, such as into twelve volts direct current, which safer voltage and current is then directed through electrical line 48 to the controller 28. Such a lower current and voltage is especially valuable for a conductive, water-based coolant environment. For additional safety and durability of the vacuum system 10, the vacuum generator 22 and controller 28 may be secured within a common housing 50 (shown in hatched lines in FIG. 1), and the common housing may also be secured to the sealing cap 38 of the collector 18. The housing 50 thereby protects and supports the vacuum generator 22 and controller 28 from damage by impact and/or contamination risks of a factory environment, and also facilitates efficient operation of the system 10. As recited in more detail below, the housing 50 may also include cooling holes for permitting compressed air to pass out of the compressed air vent 27 and to move over and around and to thereby cool controller components 28 and any other components within the housing 50 that generate heat.

As also shown in FIG. 1, the vacuum system 10 may include a screen 52 positioned between the separator 12 and the holder 16, wherein a shortest internal diameter of the vacuum line 20 extending between the holder 16 and the collector 18 is at least two times greater than a longest distance across any passageways defined within the screen 52. That relationship between the screen 52 passageways and the vacuum line 20 minimizes the possibility of solid particulates clogging the vacuum line 20. In an additional embodiment, the vacuum line 20 may be dimensioned to enhance degassing by optimizing a relationship between an internal diameter of the vacuum line 20 and a length of the vacuum line 20 between the holder 16 and the collector 18 in order to exceed a minimal residence time for the separated immiscible liquid passing through the vacuum line 20. For example, an internal diameter of the vacuum line 20 of about or less than one-quarter inch (0.25") and a length of about or greater than about eight feet (8.0') produces nearly optimal degassing of the collected, separated liquid passing through the vacuum line to the collector. For all purposes herein, the word "about" is to mean plus or minus fifteen percent.

Figure 2:
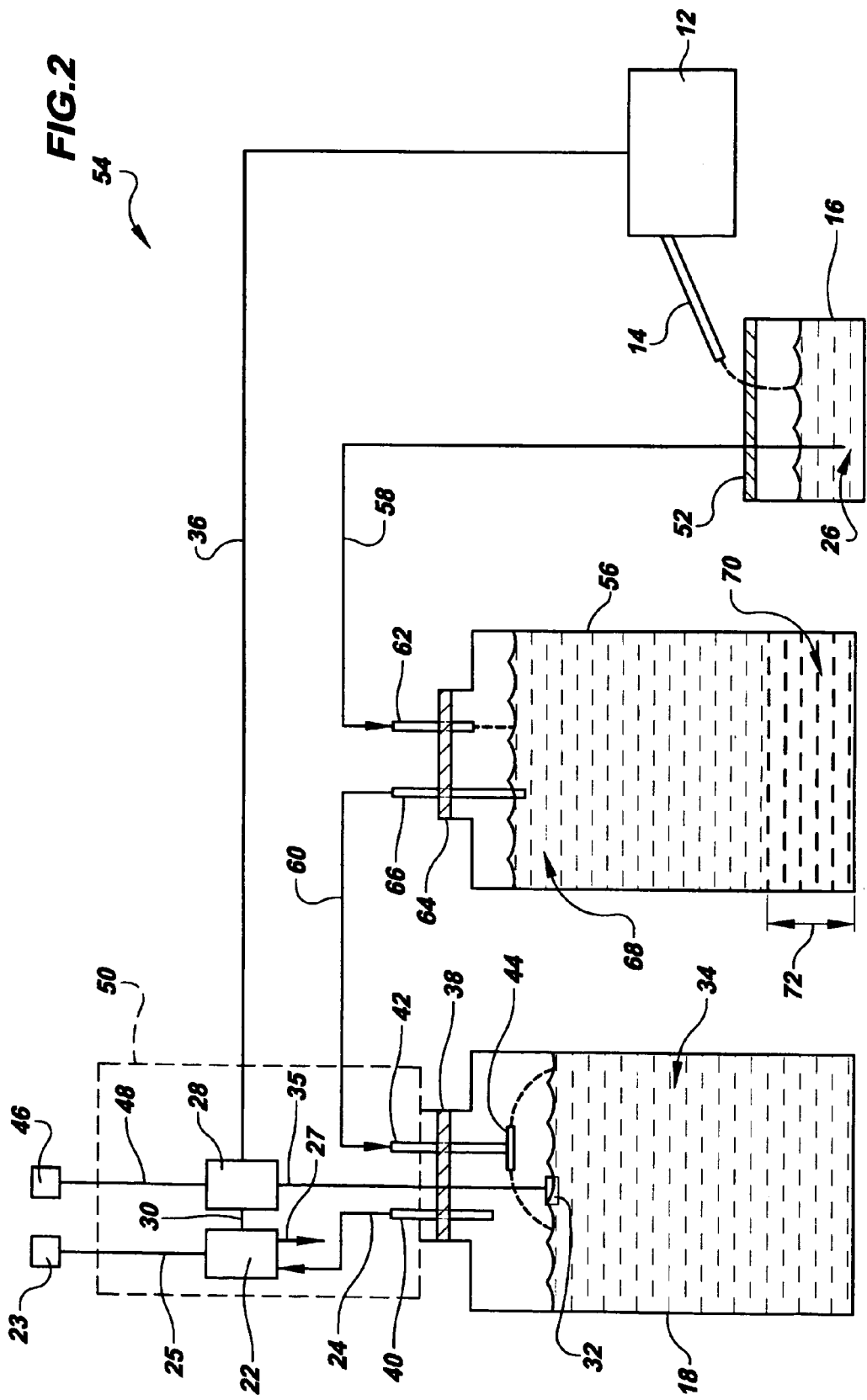
FIG. 2 is a simplified, schematic representation of an alternative embodiment of the vacuum separation, transport and collection system for immiscible liquids showing a separation container secured on a vacuum line between a holder and a collector of the system.

As shown in FIG. 2, an alternative embodiment of the vacuum separation, transport and collection system 54 may also include a separation container 56 secured between the holder 12 and the collector 18. (For components of the alternative embodiment of the vacuum system 54 shown in FIG. 2 that are the same as components of the FIG. 1 embodiment of the vacuum system 10, the same reference numerals are used in both FIGS. 1 and 2.) The separation container 56 is secured to a first vacuum line extension 58 that is secured between the separation container 56 and the holder 16, and the separation container 56 is also secured to a second vacuum line extension 60 that is secured between the separation container 56 and the collector 18. The first vacuum line extension 58 passes through a third vacuum fitting 62 secured within a vacuum sealed cap 64 of the separation container 56. The second vacuum line extension 60 passes through a fourth vacuum fitting 66 within the vacuum sealed cap.

The separation container 56 provides for gravity-based separation of a second immiscible liquid (such as a water-based coolant) from the first or separated immiscible liquid which is typically an undesired, oil-based contaminant of the water-based coolant. The second vacuum line extension 60 is secured adjacent the vacuum sealing cap 64 of the separation container 56 so that lighter, oil-based separated water immiscible liquid 68 within the container 56 is drawn off by the vacuum within the second vacuum line extension 60. Separated second immiscible liquid 70 collected adjacent a bottom region 72 of the separation container 56 remains within the separation container 56, and may be removed, while the system 54 is not operating, by simply removing the separation container 56 from its cap 64 and pouring out the water-based, heavier second immiscible liquid 70, or by automatically discharging the water-based, second immiscible liquid through an automatic discharging apparatus (not shown) known in the art. The separation container 56 provides for enhanced separation of the immiscible liquids 68, 70, and for capturing any desired, heavier second immiscible liquid 70 to prevent it being directed into the collector 18. For even further enhanced separation, a plurality of separation containers (not shown) may be utilized in the manner described above for the separation container 56.

Figure 3:
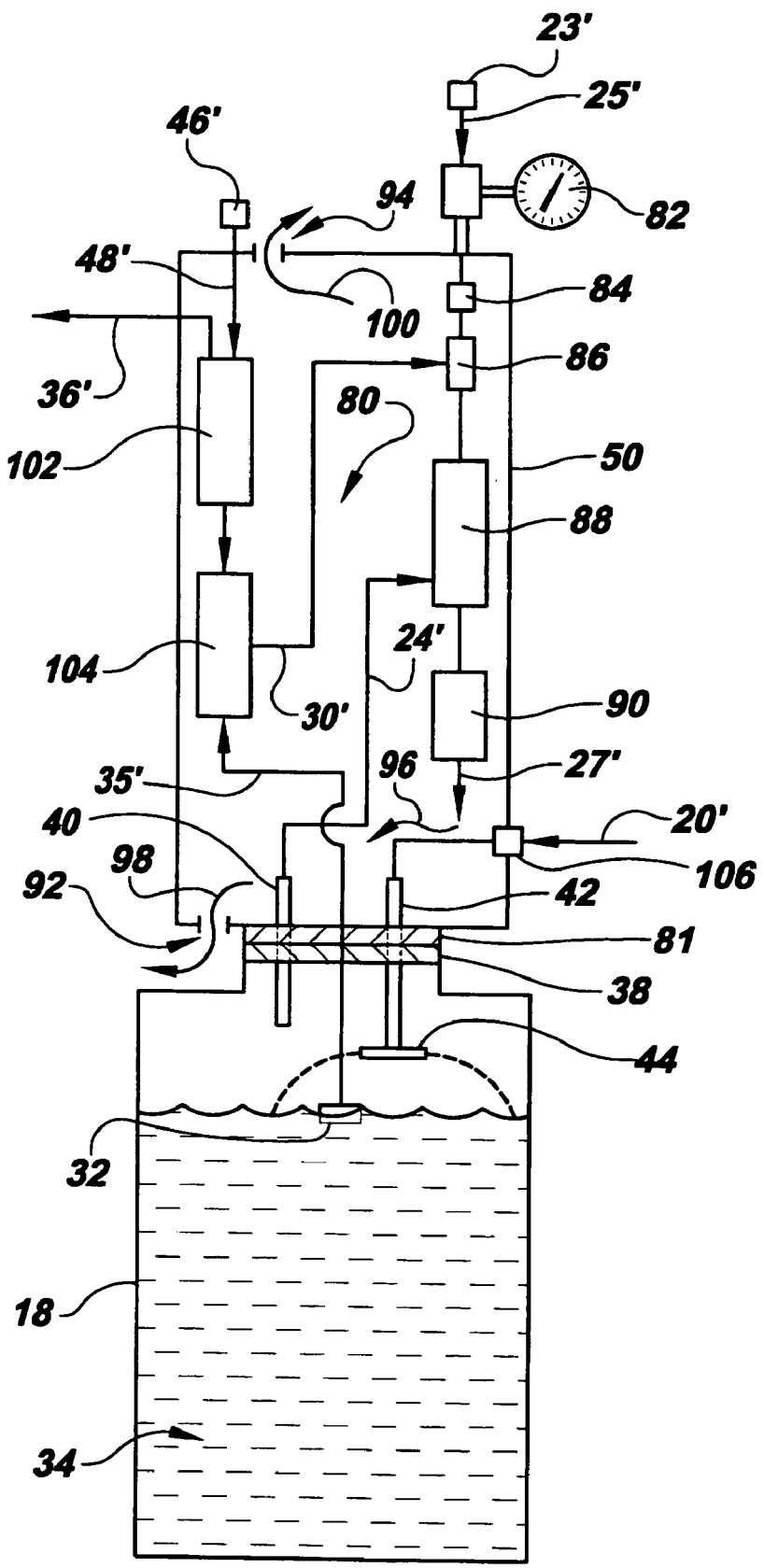
FIG. 3 is a simplified, schematic representation of an additional embodiment of the vacuum separation, transport and collection system for immiscible liquids, showing components of a controller and a vacuum generator secured within a common housing.

FIG. 3 shows a preferred controller means 80 within the housing 50 for applying a vacuum to the collector 18 for a predetermined vacuum duty cycle for periodically removing separated immiscible liquid 26 from the holder 16 (shown in FIGS. 1 and 2) into the collector 18 and for controlling operation of the separator 12 (shown in FIGS. 1 and 2) for a predetermined separator duty cycle. In FIG. 3, the housing 50 is secured by a housing cap 81 that is integral with the cap 38 of the collector 18, and through which the first and second vacuum fittings 40, 42 pass between the housing 50 and the collector 18.

The preferred controller means 80 includes a compressed air source 23' (reference numerals in FIG. 3 that designate similar components shown in FIGS. 1 and 2 are shown in FIG. 3 as primes of the reference numerals in FIGS. 1 and 2) that directs compressed air through a compressed air feed line 25' through a pressure regulator 82 secured to the housing 50, and through an air filter 84 that may be secured within the housing 50. A control solenoid 86 is secured downstream of the filter 84, and a venturi-effect vacuum generator 88 is secured to the compressed air feed line 25' downstream of the control solenoid 86. An exemplary control solenoid 86 is available under part number 1162118-38, from the ARO division of the Ingersoll-Rand company, located in Bryan, Ohio. An exemplary air filter 84 is available under the catalogue number 98355 KB31, from the Mc Master Carr company located in New Brunswick, N.J. An exemplary venturi-effect vacuum generator 88 including a muffler 90 is available as the aforesaid part no. VG-010-00-00 from the GAST Manufacturing, Inc. company, a division of the IDEX Corporation of Benton Harbor, Mich. The muffler 90 may also be included downstream of the vacuum generator 88 to dampen noise of the compressed air moving through the above-described components. The compressed air passes out of the muffler 90, and through a compressed air vent 27' to the interior of the housing 50. The housing may define one or more cooling holes 92, 94 that permit venting of the compressed air, as represented by air flow arrows 96, 98, and 100, out of the housing 50 to remove heat from within the housing, thereby cooling components of the preferred controller 80.

The preferred controller means 80 also includes a low current, low voltage power source 46' that directs electrical energy through power line 48' to a first or separator timer 102, and then to a second or vacuum generator timer 104. The first and second timers may be any timers capable of actuating the separator 12 and control solenoid 86 know in the art. Exemplary timers are available under the aforesaid brand name of "TGKAD Series", part no. 72200/05HAA2H from the Airtronics company of Cazenovaia, N.Y. The first or separator timer 102 communicates with the separator 12 through line 36' to initiate and/or terminate the separator duty cycle of the separator 12. Similarly, the second or vacuum generator timer 104 communicates through the electric line 30' to the control solenoid 86 to initiate and/or terminate the vacuum duty cycle of the vacuum generator 88. The volume sensor 32 may also communicate with the second timer 104 through line 35', or directly with the control solenoid 86, to terminate the vacuum duty cycle and application of the vacuum to the collector 18 whenever the collected immiscible liquid 34 within the collector reaches a predetermined volume to avoid overfilling of the collector 18.

A preferred method of operation of the vacuum separation, transport, and collection system 10 includes the steps of operating the controller 28 or the preferred controller means 80 to control the separator 12 to separate the immiscible liquid and direct it to flow into the holder 16 for a predetermined separator duty cycle, and to control the vacuum generator 88 to apply, a vacuum to the collector 18 to direct the immiscible liquid from the holder 16 to the collector 18 for a predetermined vacuum duty cycle, wherein the vacuum generator 88 is only operated when the separator 12 is operating, and a duration of time of the vacuum duty cycle is a shorter than a duration of time of the separator duty cycle. As shown in FIG. 3, in such a method of operation the vacuum is directed from the vacuum generator 88 through vacuum inlet line 24', and the vacuum passes from the collector 18 into the vacuum line 20' that passes into the housing 50 through a vacuum line fitting 106 in the housing 50 so that the immiscible liquid passes through the vacuum line 20' into the collector 18. In a further preferred method of operation of the system 10 and in a further preferred embodiment of the system 10, a force of the vacuum generated, and the interior dimensions of the vacuum line 20' are cooperatively dimensioned so that a flow rate of immiscible liquid from the holder 16 to the collector 18 is at least two times, greater than a flow rate of separated immiscible liquid from the separator 12 into the holder 16.

Consequently, the method of operation of the vacuum system 10 may include the steps of operating the preferred controller 80 so that the separator timer 102 controls the separator 12 to separate the immiscible liquids for a predetermined duty cycle, and operating the preferred controller 80 so that the vacuum timer 104 controls the vacuum generator 88 to apply a vacuum to the collector 18 for a predetermined vacuum duty cycle, wherein the vacuum generator is only operated when the separator is operating, and the duration of time of the vacuum duty cycle is no greater than one-half of the duration of time of the separator duty cycle.

As is apparent, the vacuum separation, transport and collection system 10 provides an efficient, durable, safe and fully automated apparatus and system that solves may problems related to separation, transport and collection of immiscible liquids. The system 10 minimizes need for any manual operation to avoid spilling dangerous immiscible oil-based contaminants. The system 10 also does not require active pumping of separated immiscible liquids, thereby reducing cost and maintenance obligations of known systems. By using a vacuum to transport and collect the immiscible liquids, the vacuum system 10 provides for long-term, uninterrupted separation, transport and collection of immiscible liquids while minimizing manufacture and operating costs. Also, controlling the separator means 12 to only operate for intermittent separator duty cycles, minimizes an amount of coolant drawn by the separator 12 into the holder 16.

While the present invention has been disclosed with respect to the described and illustrated embodiments and methods of operation of a vacuum separation, transport and collection system 10 for immiscible liquids, it is to be understood that the invention is not to be limited to those embodiments. For example, while the preferred controller means 80 shown in FIG. 3 discloses the first and second timers 102, 104 and control solenoid as being separate components, it is to be understood that those components may be integral with each other. Also, the controller means 28 (shown in FIGS. 1 and 2) may include other components known in the art for performing the described functions of the controller means 28 and preferred controller means 80. Accordingly, reference should be made primarily to the following claims rather than the foregoing description to determine the scope of the invention.

What is claimed is:

1. A vacuum separation, transport and collection system (10) for immiscible liquids, the system (10) comprising:
    a. separator means (12) for separating two or more immiscible liquids;
    b. a holder (16) in fluid communication with the separation means (12) for receiving and holding separated immiscible liquid (26) from the separation means (12);
    c. a collector (18) in fluid communication through a vacuum line (20) with the holder (16);
    d. vacuum generator means (22) in fluid communication with the collector (18) for applying a vacuum to the collector (18) and from the collector (18) through the vacuum line (20) to the holder (16) so that separated immiscible liquid (26) in the holder (16) is drawn into the collector (18) by the vacuum; and,
    e. controller means (28) in communication with the vacuum generator means (22) for controlling the vacuum generator means (22) to apply a vacuum to the collector (18) and holder (16) for a predetermined vacuum duty cycle to periodically transport separated immiscible liquid (26) from the holder (16) to the collector (18).

2. The vacuum system (10) of claim 1, wherein the vacuum generator means (22) and vacuum line (20) are cooperatively structured so that a flow rate of immiscible liquid from the holder (16) to the collector (18) is greater than a flow rate of separated immiscible liquid from the separator (12) to the holder (16).

3. The vacuum system (10) of claim 1, wherein the vacuum generator means (22) and the controller means (28) are secured within a common housing (50), and the housing includes an integral sealing cap (38) for sealing the housing (50) to the collector (18), the vacuum line (20) and vacuum directed from the vacuum generator means (22) pass through the sealing cap (38) into the collector (18), and the collector (18) may be removed from the sealing cap (38) to remove collected immiscible liquid (34) from the collector (18).

4. The vacuum system (10) of claim 1, wherein the vacuum generator means (22) and the controller means (28) are secured within a common housing (50), the vacuum generator means (22) includes a compressed air vent (27), and a plurality of cooling holes (92, 94) are defined within the housing (50) so that compressed air passing out of the compressed air vent (27) passes out of the cooling holes (92, 94) to remove heat from within the housing (50).

5. The vacuum system (10) of claim 1, wherein the controller means (80) includes a vacuum timer (104) secured in communication with a control solenoid (86) for controlling flow of a stream of compressed air through a venturi-effect vacuum generator (88), so that the vacuum timer (104) may control application of a vacuum to the collector (18) for the predetermined vacuum duty cycle.

6. The vacuum system (10) of claim 1 wherein the system further comprises a screen (52) positioned between the separator (12) and the holder (16), wherein a shortest internal diameter of the vacuum line (20) extending between the holder (16) and the collector (18) is at least two times greater than a longest distance across any passageways defined within the screen (52).

7. The vacuum system (10) of claim 1, further comprising a separation container (56) secured between the holder (16) and the collector (18) and secured in fluid communication with the holder (16) through a first vacuum line extension (58) and secured in fluid communication with the collector (18) through a second vacuum line extension (60), so that separated immiscible liquid (26) within the holder (16) passes through the separation container (56) before entering the collector (18).

8. The vacuum system (10) of claim 1, further comprising a volume sensor (32) secured within the collector (18) and in communication with the controller means (28) for terminating generation of the vacuum by the vacuum generator means (22) whenever a predetermined volume of immiscible liquid (34) is collected within the collector (18).

9. The vacuum system (10) of claim 1, wherein the vacuum line (20) is dimensioned to have an internal diameter of or less than about one-quarter inch and a length of greater than about eight feet to enhance degassing of the immiscible liquid being transported through the vacuum line (20) from the holder (16) to the collector (18).

10. The vacuum system (10) of claim 1, further comprising a multiple outlet, unrestricting discharge nozzle (44) secured to the vacuum line (20) within the collector (18), the nozzle (44) defining a plurality of outlets through which the immiscible liquid flows into the collector (18) wherein the outlets do not restrict flow of the immiscible liquid through the vacuum line (20) and each outlet defines a narrower outlet than an internal diameter of the vacuum line (20).

11. The vacuum system (10) of claim 1, further comprising a transformer means (46) in electrical communication with the controller means (28) for converting electrical energy into an electrical current having a potential of less than thirty volts.

12. A vacuum separation, transport and collection system (10) for immiscible liquids, the system (10) comprising:
   a. separator means (12) for separating two immiscible liquids;
   b. a holder (16) in fluid communication with the separation means (12) for receiving and holding separated immiscible liquid (26) from the separation means (12);
   c. a collector (18) in fluid communication through a vacuum line (20) with the holder (16);
   d. vacuum generator means (22) in fluid communication with the collector (18) for applying a vacuum to the collector (18) and from the collector (18) through the vacuum line (20) to the holder (16) so that separated immiscible liquid (26) in the holder (16) is drawn into the collector (18) by the vacuum; and,
   e. controller means (28) in communication with the vacuum generator means (22) and with the separator means (12) for controlling the vacuum generator means (22) to apply a vacuum to the collector (18) and holder (16) for a predetermined vacuum duty cycle to periodically transport separated immiscible liquid from the holder (16) to the collector (18), and for controlling the separator means (12) to separate immiscible liquid and direct it to flow into the holder (16) for a predetermined separator duty cycle.

13. The vacuum system (10) of claim 12, wherein the vacuum generator means (22) and vacuum line (20) are cooperatively structured so that a flow rate of immiscible liquid from the holder (16) to the collector (18) is greater than a flow rate of separated immiscible liquid from the separator (12) to the holder (16).

14. The vacuum system (10) of claim 12 wherein the vacuum generator means (22) and the controller means (28) are secured within a common housing (50), the vacuum generator means (22) includes a compressed air vent (27), and a plurality of cooling holes (92, 94) are defined within the housing (50) so that compressed air passing out of the compressed air vent (27) passes out of the cooling holes (92, 94) to remove heat from within the housing (50).

15. The vacuum system (10) of claim 12, wherein the controller means (80) includes a vacuum timer (104) secured in communication with a control solenoid (86) for controlling flow of a stream of compressed air through a venturi-effect vacuum generator (88), so that the vacuum timer (104) may control application of a vacuum to the collector (18) for the predetermined vacuum duty cycle, and the controller means (80) includes a separator timer (102) secured in communication with the separator means (12) for controlling the separator means (12) to separate the immiscible liquid and direct it to flow into the holder (16) for a predetermined separator duty cycle.

16. The vacuum system (10) of claim 12 wherein the vacuum line (20) is dimensioned to have an internal diameter of about or less than one-quarter inch and a length of about or greater than about eight feet to enhance degassing of the immiscible liquid being transported through the vacuum line (20) from the holder (16) to the collector (18).

17. A method of separating, transporting and collecting immiscible liquids, comprising the steps of:
   a. providing a separator means (12) for separating two immiscible liquids;
   b. securing a holder (16) in fluid communication with the separator means (12) for receiving a separated immiscible liquid (26);
   c. securing a collector (18) in fluid communication through a vacuum line (20) with the holder (16);
   d. controlling the separator means (12) to separate the immiscible liquid and direct it to flow into the holder (16) for a predetermined separator duty cycle; and,
   e. controlling a vacuum generator means (22) to apply a vacuum to the collector (18) and through the vacuum line (20) to the holder to direct the immiscible liquid (26) within the holder (16) to flow into the collector (18) for a predetermined vacuum duty cycle.

18. The method of claim 17, comprising the further steps of controlling the vacuum generator means (22) to apply a vacuum only when the separator means (12) is separating the immiscible liquid, and controlling the vacuum generator means (22) to apply a vacuum for a vacuum duty cycle having a duration of time of that is less than a duration of time of the separator duty cycle.

19. The method of claim 18, comprising the further steps of controlling the vacuum generator means (22) to apply a vacuum to the collector for a vacuum duty cycle having a duration of time that is no greater than one half of the duration of time of the separator duty cycle.

20. The method of claim 19, comprising the further steps of providing the vacuum line (20) between the holder (16) and the collector (18) and controlling the vacuum generator means (22) so that the separated immiscible liquid is transported from the holder (16) to the collector (18) at a flow rate that is at least two times greater than a flow rate of the separated immiscible liquid from the separator (12) into the holder (16).

* * * * *